US006968393B1

(12) United States Patent
Chen et al.

(10) Patent No.: US 6,968,393 B1
(45) Date of Patent: Nov. 22, 2005

(54) METHOD AND APPARATUS FOR AN ATTRIBUTE ORIENTED ROUTING UPDATE

(75) Inventors: Enke Chen, San Jose, CA (US); Pedro Miguel Martins Roque Marques, San Jose, CA (US)

(73) Assignee: Redback Networks, Inc., San Jose, CA (US)

( * ) Notice: Subject to any disclaimer, the term of this patent is extended or adjusted under 35 U.S.C. 154(b) by 779 days.

(21) Appl. No.: 09/992,354

(22) Filed: Nov. 19, 2001

(51) Int. Cl.$^7$ .................... G06F 15/173
(52) U.S. Cl. ............. 709/242; 709/238; 709/224; 370/351; 370/352; 370/392
(58) Field of Search .............. 709/237–238, 709/224, 229, 242; 370/317, 351–352, 400, 370/395.31, 392

(56) References Cited

U.S. PATENT DOCUMENTS

| | | | | |
|---|---|---|---|---|
| 5,386,413 A | * | 1/1995 | McAuley et al. | 370/392 |
| 5,917,821 A | * | 6/1999 | Gobuyan et al. | 370/392 |
| 6,195,703 B1 | * | 2/2001 | Blumenau et al. | 709/238 |
| 6,307,855 B1 | * | 10/2001 | Hariguchi | 370/392 |
| 6,529,508 B1 | * | 3/2003 | Li et al. | 370/392 |
| 6,556,547 B1 | * | 4/2003 | Srikanth et al. | 370/317 |
| 6,574,667 B1 | * | 6/2003 | Blumenau et al. | 709/229 |
| 6,584,093 B1 | * | 6/2003 | Salama et al. | 370/351 |
| 6,704,795 B1 | * | 3/2004 | Fernando et al. | 709/237 |
| 6,760,777 B1 | * | 7/2004 | Agarwal et al. | 709/238 |
| 6,850,976 B1 | * | 2/2005 | Xia | 709/224 |
| 2002/0080798 A1 | * | 6/2002 | Hariguchi et al. | 370/395.31 |
| 2002/0143755 A1 | * | 10/2002 | Wynblatt et al. | 707/3 |
| 2003/0014540 A1 | * | 1/2003 | Sultan et al. | 709/240 |
| 2003/0026246 A1 | * | 2/2003 | Huang et al. | 370/352 |
| 2003/0026268 A1 | * | 2/2003 | Navas | 370/400 |
| 2003/0200307 A1 | * | 10/2003 | Raju et al. | 709/224 |

OTHER PUBLICATIONS

Y. Rekhter and T. Li, A Border Gateway Protocol 4 (BGP-4), RFC 1771, pp. 47-48 (51 pages total), Mar. 1995.

* cited by examiner

Primary Examiner—Wen-Tai Lin
(74) Attorney, Agent, or Firm—Blakely, Sokoloff, Taylor & Zafman

(57) ABSTRACT

A computer implemented method and apparatus for an attribute-oriented routing update is described. The method comprises selecting an updated set of attributes in a routing table before selecting a set of updated destinations associated with the selected set of attributes, wherein the attributes are stored in an attribute table as a portion of the routing table and the attributes do not include the conventional network prefixes. An update message that includes the set of updated destinations for the set of attributes is then generated. The method is also extended to extraction of unreachable destinations by using a dummy attribute in the routing table, wherein the dummy attribute is selected first, followed by extracting the unreachable destinations.

34 Claims, 13 Drawing Sheets

DESTINATION ELEMENT 301

| DESTINATION 303 | CHAIN_POINTER 307 | MODIFY 308 | PATH_POINTER 309 |
|---|---|---|---|

FIG. 3A

PATH DATA STRUCTURE 311

| NEIGHBOR 313 | BEST_FLAG 315 | ATTRIBUTE_POINTER 317 |
|---|---|---|

FIG. 3B

ATTRIBUTE ELEMENT 319

| NEXT_HOP 321 | ORIGIN 322 | AS_PATH 323 | CHAIN_POINTER 325 | CHAIN_TAIL 327 |
|---|---|---|---|---|

FIG. 3C

METHOD AND APPARATUS FOR AN ATTRIBUTE ORIENTED ROUTING UPDATE

BACKGROUND OF THE INVENTION

1. Field of the Invention

The invention relates to the field of communication. More specifically, the invention relates to communication networks.

2. Background of the Invention

A router hosts a routing protocol(s) that can include the Routing Information Protocol (RIP), Open Short Path First (OSPF), Intermediate System to Intermediate System (IS—IS), the Border Gateway Protocol (BGP), etc. The router exchanges messages with neighboring routers in accordance with one or more of the hosted routing protocols.

FIG. 1 (PRIOR ART) is a diagram illustrating a BGP update message. The BGP update message 100 includes an attributes section 101 and a network layer reachability information (NLRI) section 103. The attributes section 101 identifies various attributes defined by "A Border Gateway Protocol 4", Request for Comments 1771 by Y. Rekhter and T. Li (March 1995) (RFC 1771) that describe a path. These attributes include origin, next hop, autonomous system (AS) path, local preference, etc. The NLRI section 103 identifies destinations that can be reached via the path described by the attributes in the attributes section 101.

When a router that hosts BGP receives a BGP update message from one of its neighbors, the router updates its BGP routing table in accordance with the update message received. The BGP routing table of a router can include a large number of paths.

FIG. 2 (PRIOR ART) is a diagram illustrating a BGP table. The BGP table 200 includes a destination data structure 202 and an attribute table 201. Each element of the destination data structure 201 identifies a network prefix (e.g., an IP prefix). The element 203A is the root of the destination data structure 202. The element 203C references a linked list of path data structures 205A and 205B. One of the path data structures 205A and 205B corresponds to a best path to the destination identified by the element 203C. The path data structure 205A references the first entry in the attribute table 201. The path data structure 205B references the second entry in the attribute table 201. If the path data structure 205B corresponds with the best path to the network prefix identified by the element 203C, then the attributes in the second entry of the attribute table described that best path. An element 203D references a path data structure 205C. The path data structure 205C also references the second entry in the attribute table 201. An element 203B references a path data structure 205C, which references the last entry in the attribute table 201.

When a BGP update message is built in accordance with Appendix 6.1 of the RFC 1771, a BGP process packs network prefixes into the update message as illustrated in FIG. 1. The RFC 1771 describes address prefix oriented routing update. In other words, the BGP process builds update messages as it processes each network prefix. As each network prefix in the destination data structure 202 is processed, the BGP process allocates a BGP update message for the corresponding attributes. Each time the BGP process encounters a network prefix that corresponds to attributes of an allocated message, the BGP process appends the network prefix to the message. Each time the BGP process encounters a network prefix that corresponds to attributes that do not have an allocated message, the BGP process allocates a new update message. After the entire BGP table has been scanned, the BGP process transmits the messages and releases resources utilized for the messages.

Assuming changes are detected in the destination data structure 202, a router that hosts the BGP table 200 will begin to build BGP update messages with network prefixes identified by marked elements. Assuming that the elements 203B–203D have been marked as changed, a BGP process allocates an update message for the last entry in the attribute table 201 when the BGP process encounters the element 203B of the destination data structure 202. The network prefix identified by the element 203B is appended to the allocated message. The BGP process continues through the destination data structure 202 and allocates another update message for the first entry in the attribute table 201 when the BGP process encounters the element 203C. The BGP process allocates a third message for the second entry in the attribute table 201 when it encounters the path data structure 205B, which references the second entry. The BGP process appends the network prefix identified in the element 203C in the second and third allocated messages. The BGP process appends the network prefix identified in the element 203D to the third allocated message. Once the BGP process completes walking the destination data structure, the BGP process transmits all messages allocated for the routing table 200 and releases resources (e.g. memory) utilized for the messages.

Several years ago, this method of building BGP update messages was acceptable since a routing table identified a relatively small number of paths (e.g., a few thousand paths). This method is inefficient when applied to a routing table that identifies a very large number of paths (e.g., hundreds of thousands of paths). Allocating resources for a large number of update messages consumes vast amounts of a router's resources, and can possibly deplete its resources.

An alternative approach transmits allocated messages upon reaching a predetermined limit, such as a limit of resources. This alternative approach reduces packing efficiency of update messages. Since allocated messages are transmitted before all network prefixes are processed, the same set of attributes may be identified in multiple update messages. The transmitting network device's resources are still not utilized efficiently. Processor time spent on allocating and transmitting these update messages will increase in relation to the reduction in packing efficiency. Furthermore, resources of network device's that receive these update messages are also utilized inefficiently because of reduced packing efficiency.

BRIEF SUMMARY OF THE DRAWINGS

A method and apparatus for attribute-oriented routing update is described. According to one aspect of the invention, a computer implemented method provides for selecting an updated set of attributes in a routing table before selecting a set of updated destinations associated with the selected set of attributes. In one embodiment, an update message that includes the set of updated destinations is generated for the set of attributes.

These and other aspects of the present invention will be better described with reference to the Detailed Description and the accompanying Figures.

BRIEF DESCRIPTION OF THE DRAWINGS

Figure 1:
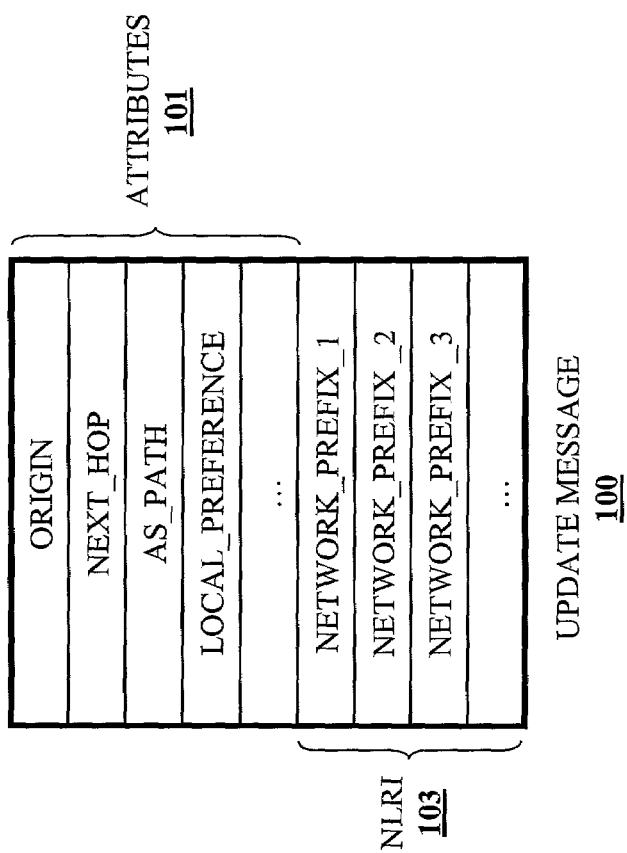

The invention may best be understood by referring to the following description and accompanying drawings that are used to illustrate embodiments of the invention. In the drawings:

FIG. 1 (PRIOR ART) is a diagram illustrating a BGP update message.

Figure 2:
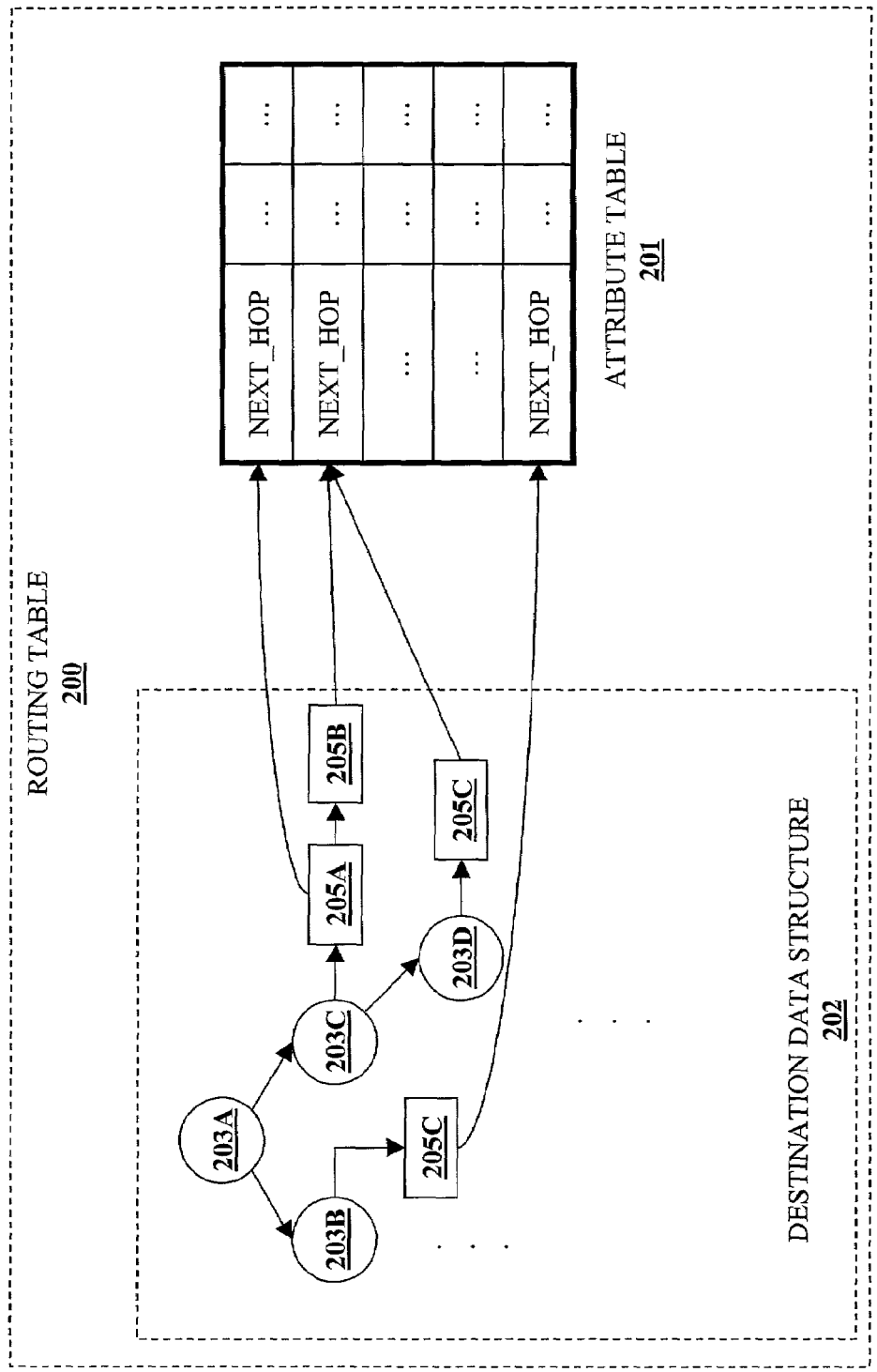

FIG. 2 (PRIOR ART) is a diagram illustrating a routing table.

FIG. 3A is a diagram illustrating an element of a destination data structure of a routing table according to one embodiment of the invention.

FIG. 3B is a diagram illustrating a path data structure of a routing table according to one embodiment of the invention.

FIG. 3C is a diagram illustrating an element of an attribute table of a routing table according to one embodiment of the invention.

Figure 4:
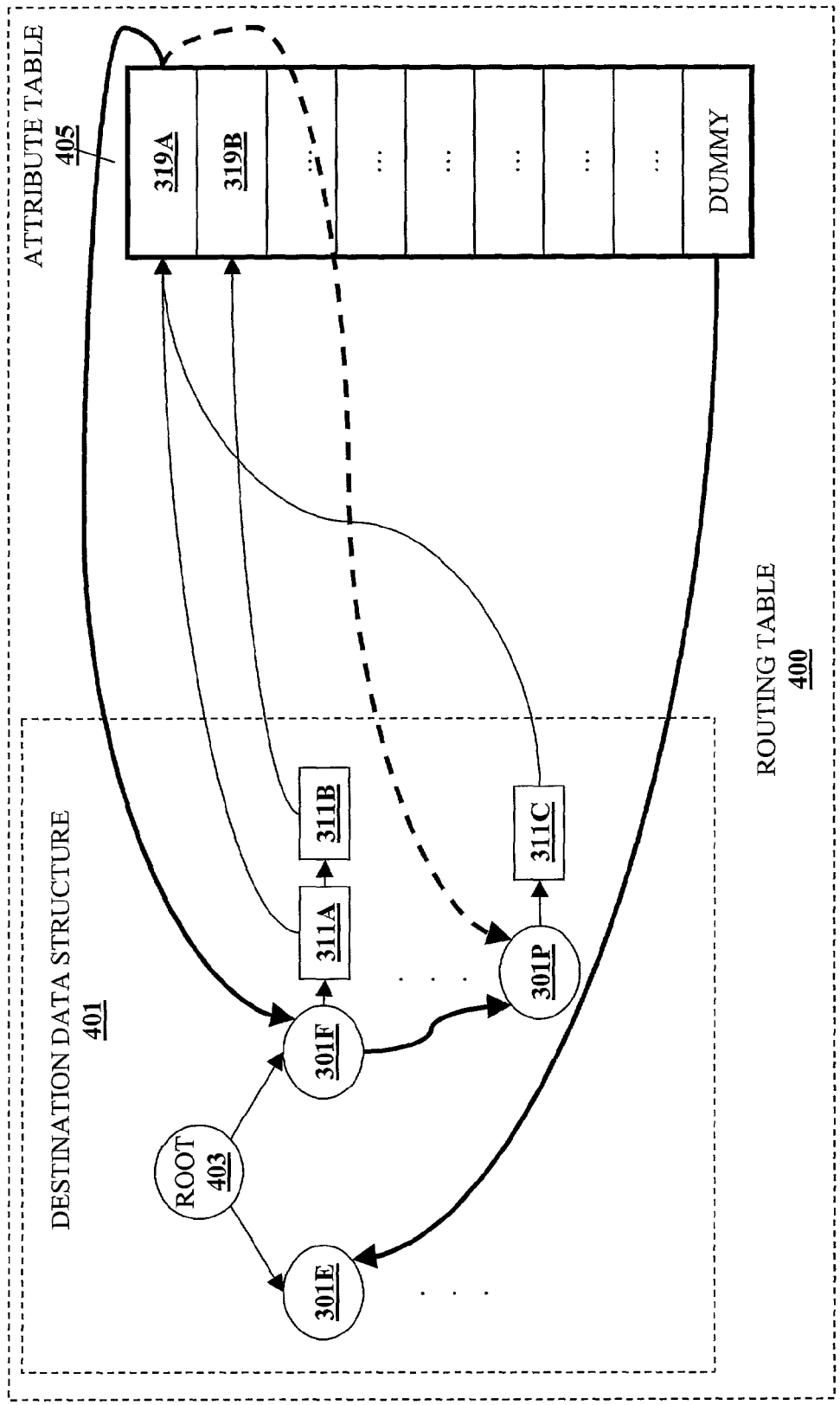

FIG. 4 is a diagram of a routing table according to one embodiment of the invention.

Figure 5:
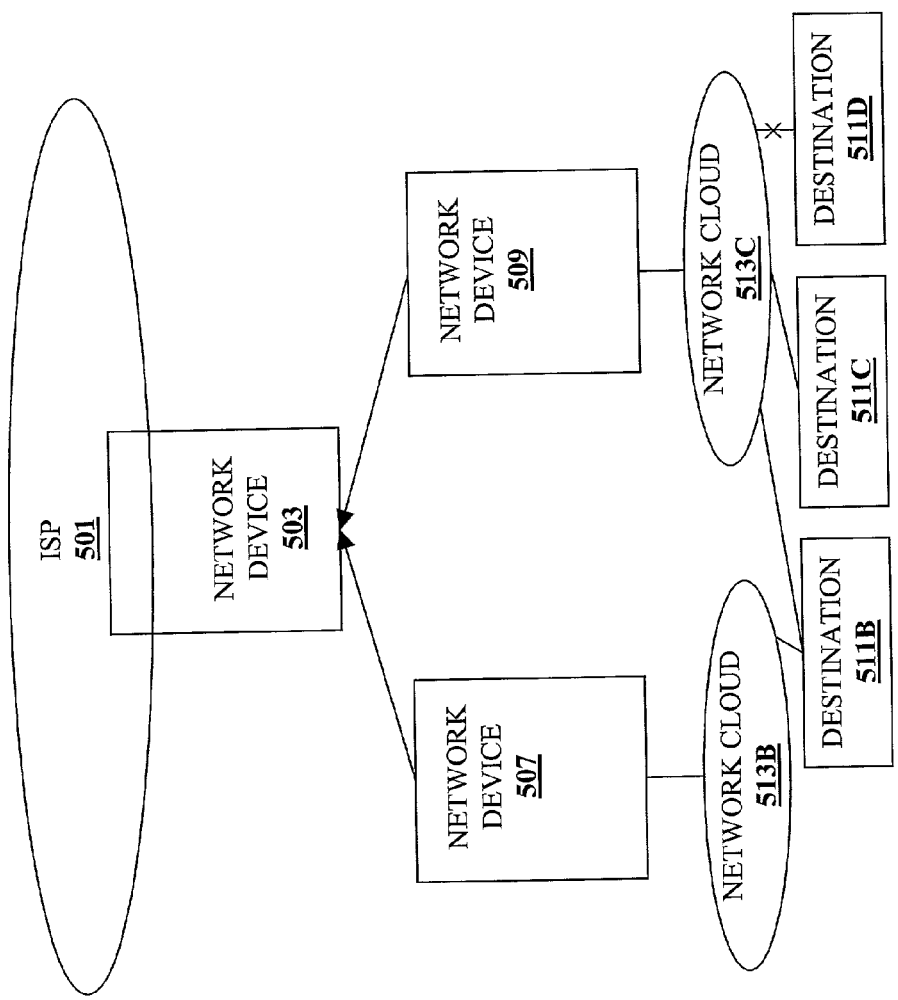

FIG. 5 is a diagram illustrating an exemplary network according to one embodiment of the invention.

Figure 6A:
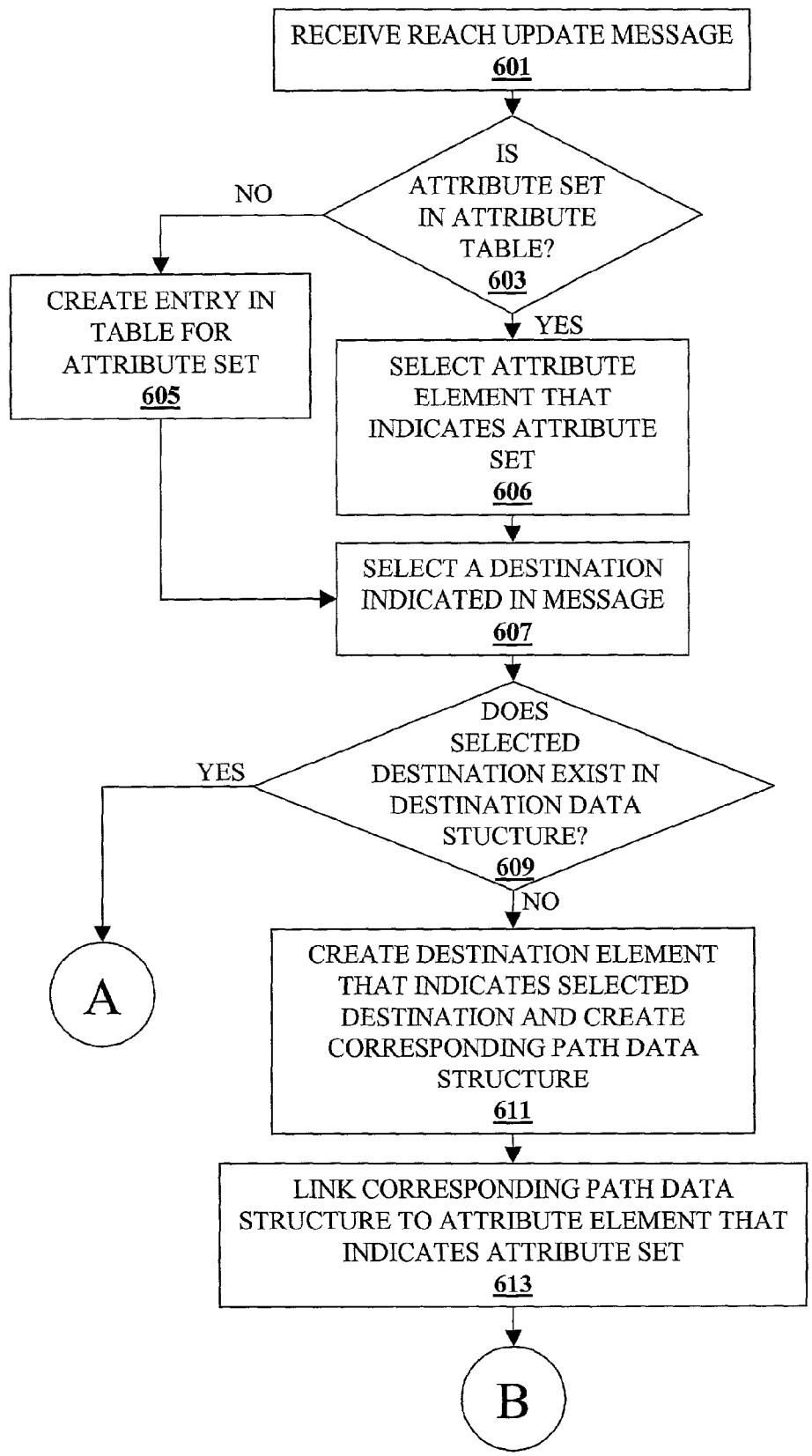

FIG. 6A is a flow chart for processing an update message indicating reachability according to one embodiment of the invention.

Figure 6B:
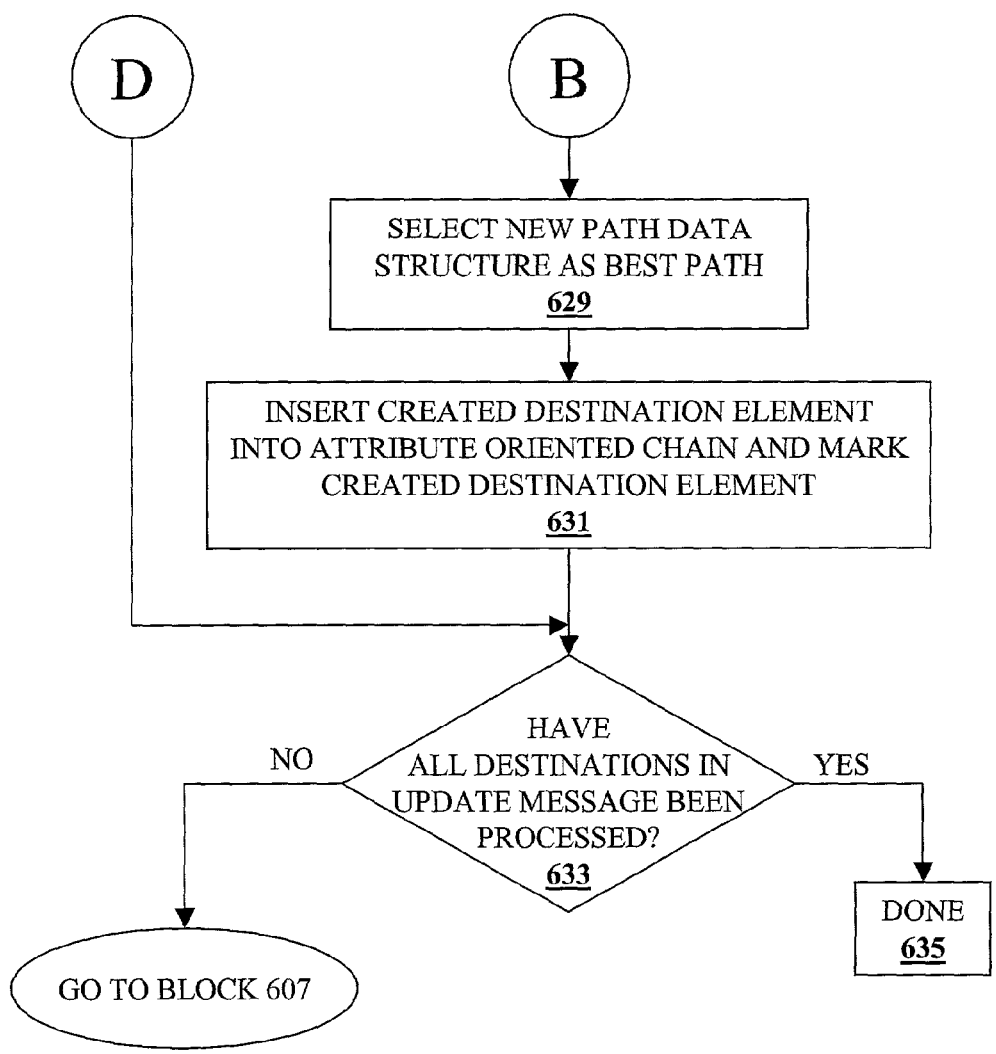

FIG. 6B is a flowchart for processing a created destination element according to one embodiment of the invention.

Figure 6C:
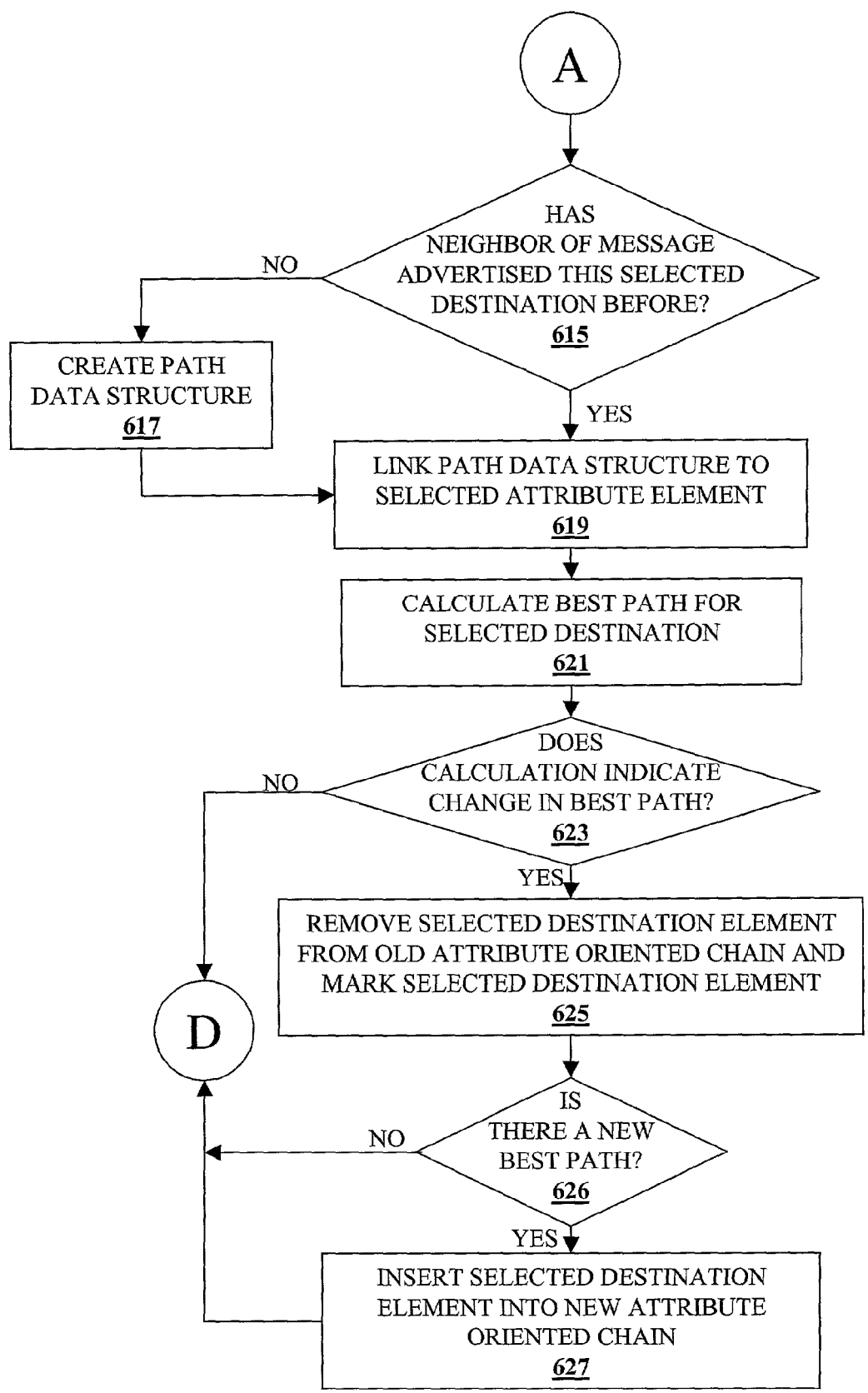

FIG. 6C is a flowchart for processing a selected destination of an update message according to one embodiment of the invention.

Figure 7A:
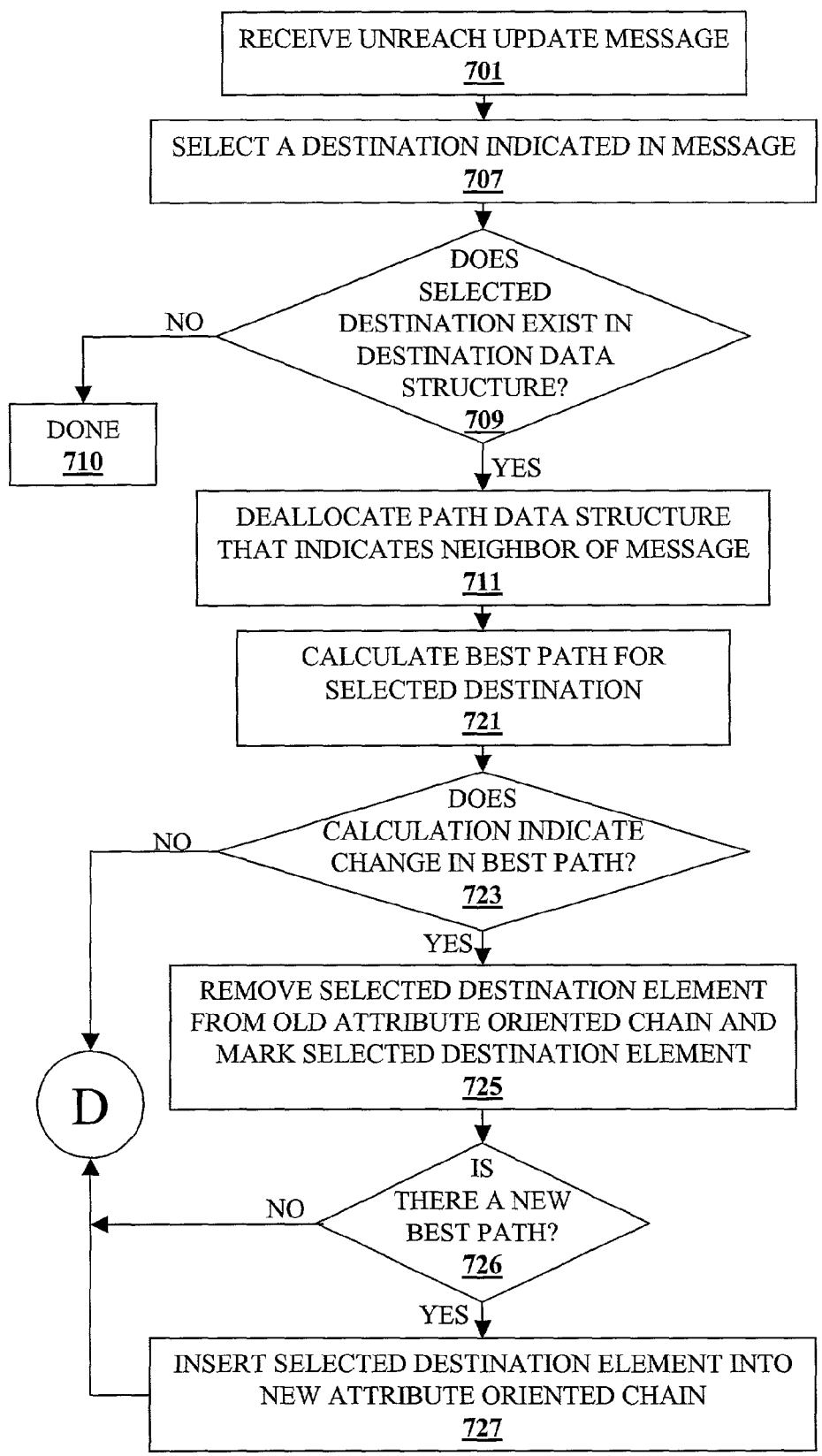

FIG. 7A is a flowchart for processing an update message indicating unreachability according to one embodiment of the invention.

Figure 7B:
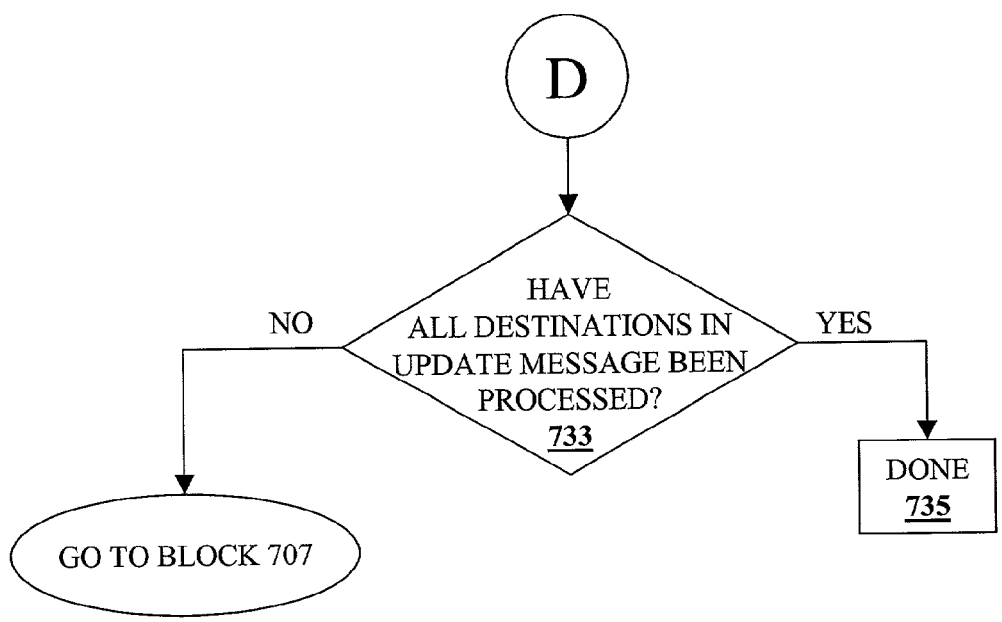

FIG. 7B is a continuation of the flowchart illustrated in FIG. 7A according to one embodiment of the invention.

Figure 8:
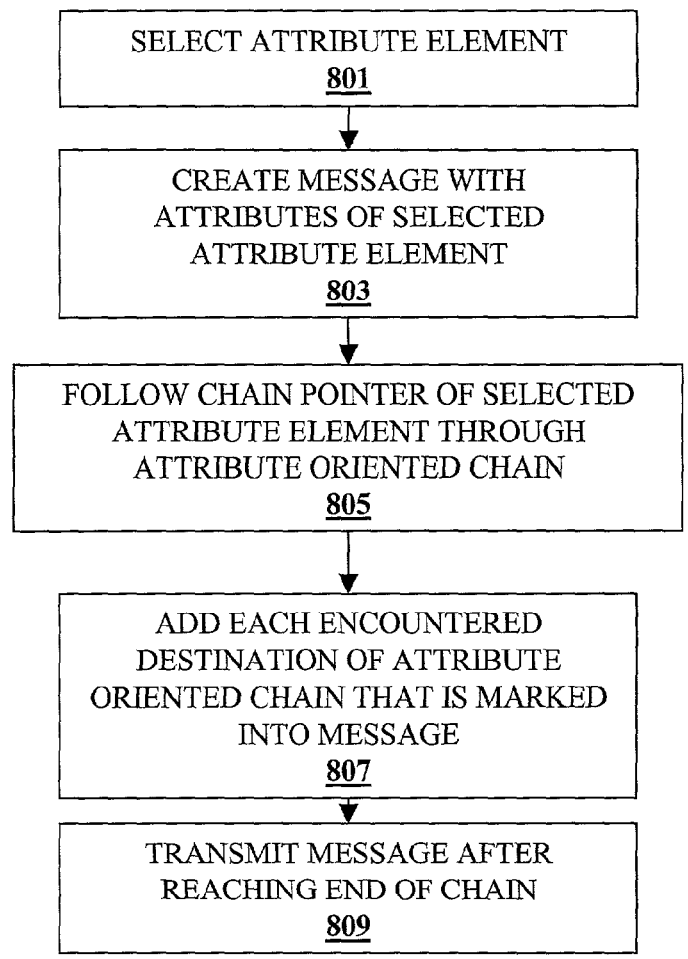

FIG. 8 is a flow chart for generating an update message indicating reachability according to one embodiment of the invention.

Figure 9:
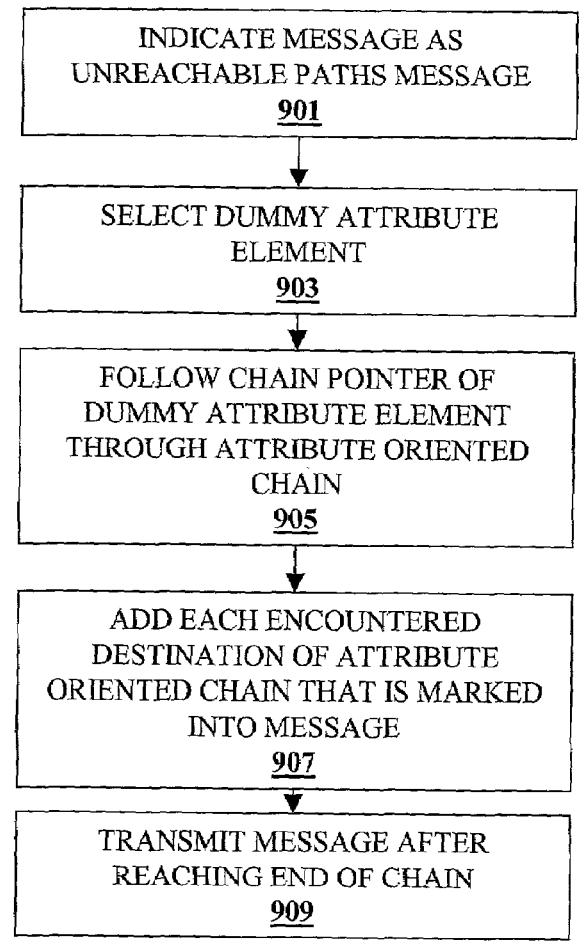

FIG. 9 is a flow chart for generating an update message indicating unreachability according to one embodiment of the invention.

Figure 10:
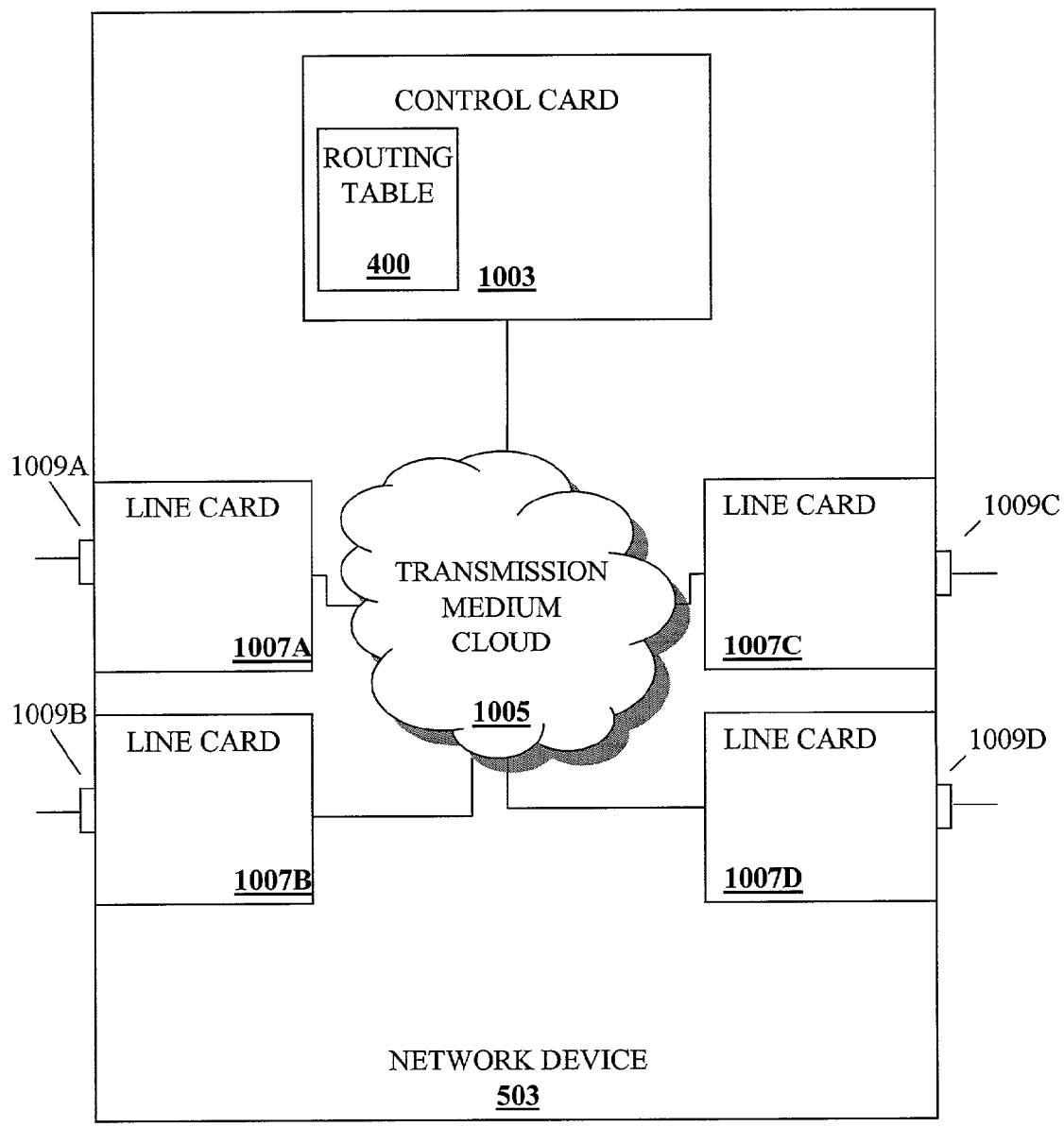

FIG. 10 is a block diagram illustrating the exemplary network device 503 according to one embodiment of the invention.

DETAILED DESCRIPTION OF THE DRAWINGS

In the following description, numerous specific details are set forth to provide a thorough understanding of the invention. However, it is understood that the invention may be practiced without these specific details. In other instances, well-known circuits, structures, standards, and techniques have not been shown in detail in order not to obscure the invention.

FIGS. 3A–3C are diagrams illustrating elements of a routing table according to one embodiment of the invention. FIG. 3A is a diagram illustrating an element of a destination data structure of a routing table according to one embodiment of the invention. In FIG. 3A, an element 301 of a destination data structure ("destination element") includes four fields: a destination field 303, a chain pointer field 307, a modify field 308, and a path pointer field 309. The destination field 303 indicates a destination, such as a network prefix (e.g., an IP address prefix). The modify field 308 is a flag that indicates whether a path of the corresponding destination element 301 has been modified. The chain pointer field 307 references another destination element in an attribute-oriented chain that includes the destination element 301. An attribute-oriented chain includes a set of destination elements that have a common set of attributes. The path pointer field 309 references a path data structure.

FIG. 3B is a diagram illustrating a path data structure of a routing table according to one embodiment of the invention. In FIG. 3B, a path data structure 311 includes 3 fields: a neighbor field 313, a best flag field 315, and an attribute pointer field 317. The neighbor field 313 indicates a neighboring network device that advertised a path to a destination indicated in a destination element that references the path data structure 311. The best flag field 313 indicates whether the path represented by the path data structure 311 is the best path to the destination of the destination element that references the path data structure 311. The attribute pointer field 317 references an element of an attribute table.

FIG. 3C is a diagram illustrating an element of an attribute table of a routing table according to one embodiment of the invention. In FIG. 3C, an element 319 of an attribute table ("attribute element") is comprised of multiple fields that describe a path. The attribute element 319 illustrated in FIG. 3C includes a next hop field 321, an origin field 322, an AS path field 323, and a chain pointer field 325. The next hop field 321 indicates a network device that is the next hop in the path described by the attribute element 319. The origin field 322 indicates the origin of the path information. The AS path field 323 indicates an AS path attribute. The chain pointer field 325 references a destination element in the attribute-oriented chain originating from the attribute element 319. The attribute element 319 can optionally include a chain tail field 327. The chain tail field 327 references the tail end of the attribute-oriented chain, thus allowing destination elements to be inserted into the attribute-oriented chain at the head or the tail. Alternative embodiments may implement different data elements in relation to the data structures implemented as described later herein.

Including references to destinations in the attribute table enables attribute-oriented routing update. A routing process may generate updates by scanning the attribute table.

FIG. 4 is a diagram of a routing table according to one embodiment of the invention. FIG. 5 is a diagram illustrating an exemplary network according to one embodiment of the invention. FIG. 5 will be described with reference to the exemplary routing table of FIG. 4. In FIG. 5, an Internet Service Provider (ISP) 501 includes a network device 503. The network device 503 acts as a border router for the ISP 501. The network device 503 is coupled with network devices 507 and 509. The network device 507 is coupled with the destination 511B via a network cloud 513B. The network device 509 is coupled with destinations 511B and 511C via a network cloud 513C. The network device 509 is also coupled with a destination 511D via the network cloud 513C, but has lost communication with the destination 511D. The network devices 507 and 509 transmit update messages to the network device 503 about paths to the destinations 511B, 511C, and 511D.

FIG. 4 illustrates a routing table 400 hosted on the network device 503. The routing table 400 is modified in accordance with messages received from the network devices 507, and 509. The routing table 400 illustrated in FIG. 4 includes a destination data structure 401 and an attribute table 405. The destination data structure 401 includes a root 403 and destination elements 301E, 301F, and 301P. In this illustration, the destination element 301F indicates the destination 511B in its destination field 303. The destination element 301F references a path data structure 311A. The path data structure 311A indicates the network device 509 in its neighbor field 313. The path data structure 311A references an attribute element 319A, which indicates attributes describing a path to the destination 511B advertised by the network device 509. The path data structure 311A is linked to a path data structure 311B. The path data structure 311B indicates the network device 507 in its neighbor field 313. The path data structure 311B references an attribute element 319B of the attribute table 405 in its attribute pointer field 317. The attribute element 319B indicates attributes describing a path to the destination 511B advertised by the network device 507.

As previously stated, the described embodiments enable a routing process to perform attribute-oriented routing updates. As a routing process encounters updated entries in the attribute table and/or entries in the attribute table associated with updated destinations, the routing process builds an update message with updated destinations associated with the encountered entry. After the routing process has selected all destinations associated with the encountered entry or reached a limit, the routing process can transmit the update message and release resources for the update message. Alternatively, the routing process can reuse the resources for the next encountered entry. Hence, a network device's resources are not consumed by multiple messages for multiple attribute entries. In addition, the network devices that receive these update message do not expend resources looking up the same set of attributes for multiple update messages.

In this illustration, the path data structure 311A is indicated as corresponding to the best path by its best flag field 315. Since the path data structure 311A is indicated as corresponding to the best path, the chain pointer field 325 of the attribute element 319A references the destination element 301F. Hence, the destination element 301F is in the attribute-oriented chain of the attribute element 319A.

The destination element 301P references a path data structure 311C. The destination element 301P indicates the destination 511C in its destination field 303. The path data structure 311C indicates the network device 509 in its neighbor field 313. The path data structure 311C references an attribute element 319A in its attribute pointer field 317. The attribute element 319A indicates a set of attributes describing a path to the destination 511C advertised by the network device 509. The path data structure 311C is indicated as corresponding to the best path according to its best flag field 315. Since the path data structure 311C and the attribute element 319A correspond to the best path to the destination 511C, the destination element 301P is also in the attribute-oriented chain of the attribute element 319A. Therefore, the destination element 301F, which is the head of the attribute-oriented chain of the attribute element 319A, references the destination element 301P in its chain pointer field 307. The destination element 301E indicates the destination 511D in its destination field 303. The network device 509 has indicated to the network device 503 that the destination 511D is unreachable. Since the destination 511D is unreachable, the destination element 301E is inserted into a dummy attribute-oriented chain. A dummy attribute element of the attribute table 405 references the dummy attribute chain.

While one embodiment is described having particular exemplary data structure, alternative embodiments may use any number of other data structures. For example, in an alternative embodiment of the invention, the destination data structure may be a hash table. In such an embodiment, the indices of the hash table may be destinations. Each hash table index may reference a linked list of path data structures. The chain pointer destination element and each attribute element may identify elements in an attribute-oriented chain by their hash value. Alternatively, the chain pointer may identify elements in an attribute-oriented chain by their address. The described embodiments of the invention are intended to aid in the understanding of the invention and not meant to be limiting upon the invention.

FIG. 6A is a flow chart for processing an update message indicating reachability according to one embodiment of the invention. At block 601, a network device receives an update message indicating reachability. At block 603, the network device determines if the attribute set indicated in the update message is in its attribute table. If the network device determines that the attribute set indicated in the update message is not in its attribute table, then at block 605 the network device creates an attribute element in the attribute table for the attribute set. Control flows from block 605 to block 607. If the network device determines that the attribute set is in its attribute table, then at block 606 the network device selects the attribute element that indicates the attribute set. At block 607, the network device selects a destination indicted in the update message.

At block 609, the network device determines if the selected destination exists in its destination data structure. If the network device determines that the selected destination exists in its destination data structure, then control flows to block 615. If the network device determines that the selected destination does not exist in its destination data structure, then at block 611 the network device creates a corresponding destination element that indicates the selected destination and creates corresponding path data structure. The created corresponding path data structure will indicate the network device that transmitted the update message in its neighbor field. At block 613 the network device links the corresponding path data structure to the attribute element that indicates the attribute set. Control flows from block 613 to block 629.

FIG. 6B is a flowchart for processing a created destination element according to one embodiment of the invention. At block 629, the best flag field of the created path data structure indicates the path data structure as corresponding to the best path. At block 631 the network device inserts the created destination element into an attribute-oriented chain of the attribute element and marks the created destination element. At block 633, the network device determines if all destinations in the update message have been processed. If all the destinations in the update message have been processed, then the process is done at block 635. If all destinations indicated in the update message have not been processed, the control flows back to block 607.

FIG. 6C is a flowchart for processing a selected destination of an update message according to one embodiment of the invention. At block 615, the network device determines if the neighbor previously advertised the selected destination. If the neighbor had not previously advertised the selected destination, then at block 617 the network device creates a new path data structure that indicates the neighbor in its neighbor field. Control flows from block 617 to block 619. If the neighbor had previously advertised the selected destination, then at block 619 the network device links the path data structure corresponding to the neighbor to the selected attribute element. At block 621, the network device calculates the best path for the selected destination.

At block 623, the network device determines if the best path calculation indicates a change in best path. If the best path calculation does not indicate a change in best path, then control flows to block 633. If the best path calculation indicates a change in best path, then at block 625 the network device removes the selected destination element from the old attribute-oriented chain and marks the selected destination element. At block 626 the network device determines if there is a new best path. If there is not a new best path, then control flows to block 633. If there is a new best path, then at block 627 the network device inserts the selected destination element into a new attribute-oriented chain corresponding to the selected attribute element. Control flows from block 627 to block 633.

Various embodiments may indicate the best path differently. Alternative embodiments may maintain elements of the path data structure so that the first element is the best path. Hence, the best path calculation at block 621 results in a reordering of the path data structure. Maintaining the path data structure in this manner allows the network device to select the first element of the best path data structure instead of making a determination. In another embodiment, each element of the destination data structure includes a reference for the element in the path data structure that is currently represents the best path and a separate reference for the path data structure (e.g., a pointer(s) to the first and/or last element of the path data structure, a pointer to the root of the path data structure as a tree, a reference to the location of the path data structure as a hash table. etc.).

FIGS. 7A–7B are flow charts for processing an update message indicating unreachability according to one embodiment of the invention. FIG. 7A is a flowchart for processing an update message indicating unreachability according to one embodiment of the invention. At block 701 of FIG. 7A a network device receives an update message indicating unreachability. At block 707 the network device selects a destination indicated in the update message. At block 709, the network device determines if the selected destination exists in its destination data structure. If the selected destination does not exist in the network device's destination data structure, then at block 710 the process is done. If the selected destination exists in the network devices data structure, then at block 711 the network device deallocates the path data structure that indicates the neighbor of the update message. At block 721 the network device calculates a best path for the selected destination.

At block 723, the network device determines if the best path calculation indicates a change in best path. If the best path calculation does not indicate a change in best path, then control flows to block 733. If the best path calculation indicates a change in best path, then at block 725 the network device removes the selected destination element from the old attribute-oriented chain and marks the selected destination element. At block 726, the network device determines if there is a new best path. If there is not a new best path, then control flows to block 733. If a new best path has been selected, then at block 727 the network device inserts the selected destination element into a new attribute-oriented chain of the attribute element referenced by the path data structure corresponding to the new best path. Control flows from block 727 to block 733.

FIG. 7B is a continuation of the flowchart illustrated in FIG. 7A according to one embodiment of the invention. At block 733 the network device determines if all destinations in the update message indicating unreachability have been processed. If all destinations in the update message have been processed, then the process is done at block 735. If all destinations in the update message have not been processed, then control flows to block 707.

Various embodiments described with respect to FIGS. 6A–6C may also be applied to FIGS. 7A–7B.

FIG. 8 is a flow chart for generating an update message indicating reachability according to one embodiment of the invention. At block 801, the network device selects an attribute element from the attribute table. Various embodiments of the invention may select attribute elements differently. In one embodiment of the invention, the network device walks through the attribute-oriented chain of each attribute element in the attribute table. In another embodiment of the invention, the network device selects marked attribute elements. At block 803, the network device creates an update message with attributes of the selected attribute element. At block 805, the network device follows the chain pointer of the selected attribute element through its attribute-oriented chain. A block 807, the network device adds each encountered destination of the attributed oriented chain that is marked into the message. At block 809, the network device transmits the update message after reaching the end of the attribute-oriented chain.

FIG. 9 is a flow chart for generating an update message indicating unreachability according to one embodiment of the invention. At block 901, the network device identifies an allocated update message as indicating unreachability. At block 903, the network device selects the dummy attribute element. At block 905, the network device follows the chain pointer of the dummy attribute element through the dummy attribute element's attribute-oriented chain. At block 907, the network device adds each encountered destination of the dummy attribute-oriented chain that is marked into the update message. At block 909, the network device transmits the update message indicating unreachability after reaching the end of the dummy attribute-oriented chain.

While the flow diagrams in the Figures show a particular order of operations performed by certain embodiments of the invention, it should be understood that such order is exemplary (e.g., alternative embodiments may perform certain of the operations in a different order, combine certain of the operations, perform certain of the operations in parallel, etc.). For example, the described embodiments enable a multiprocessor system to generate update messages for multiple entries of an attribute table while prefix-oriented update does not lend itself to such an implementation.

FIG. 10 is a block diagram illustrating the exemplary network device 503 according to one embodiment of the invention. In FIG. 10, a control card hosts the routing table 400. In various embodiments of the invention, the routing table 400 can be hosted on a co-processor, an ASIC, etc. The control card 1003 is coupled with a transmission medium cloud 1005 (e.g., a system bus, point to point connections between line cards, a combination of the above, etc.). The transmission medium cloud 1005 is coupled with line cards 1007A–1007D. The line cards 1007A–1007D are coupled to physical interfaces 1009A–1009D respectively. The network device 503 receives updates messages and transmits update messages via the physical interfaces 1009A–1009D.

The control card 1003 and the line cards 1007A–1007D illustrated in FIG. 10 includes memories, processors, and/or ASICs. Such memories include a machine-readable medium on which is stored a set of instructions (i.e., software) embodying any one, or all, of the methodologies described herein. Software can reside, completely or at least partially, within this memory and/or within the processor and/or ASICs. For the purpose of this specification, the term "machine-readable medium" shall be taken to include any mechanism that provides (i.e., stores and/or transmits) information in a form readable by a machine (e.g., a computer). For example, a machine-readable medium includes read only memory ("ROM"), random access memory ("RAM"), magnetic disk storage media, optical storage media, flash memory devices, electrical, optical, acoustical, or other form of propagated signals (e.g., carrier waves, infrared signals, digital signals, etc.), etc.

While the invention has been described in terms of several embodiments, those skilled in the art will recognize that the invention is not limited to the embodiments described. Various embodiments of the invention can implement the attribute table differently. One embodiment can implement the attribute table as a tree structure instead of a hash table.

The method and apparatus of the invention can be practiced with modification and alteration within the spirit and scope of the appended claims. The description is thus to be regarded as illustrative instead of limiting on the invention.

We claim:

1. A computer implemented method comprising:
   selecting an updated set of attributes in a routing table before selecting a set of updated destinations associated with the selected set of attributes, wherein the selected set of attributes does not include a network prefix;
   generating an update message that includes the set of updated destinations;
   selecting a dummy attribute in the routing table before selecting a second set of updated destinations associated with the dummy attribute; and
   generating a second update message indicating the second set of updated destinations as unreachable.

2. The computer implemented method of claim 1 wherein the routing table includes a destination data structure and an attribute data structure, wherein the destination data structure includes the set of updated destinations and a set of path data structures, and wherein an attribute data structure includes an entry indicating the updated set of attributes.

3. The computer implemented method of claim 2 wherein the destination data structure is a radix trie.

4. The computer implemented method of claim 2 wherein the destination data structure is a hash table.

5. The computer implemented method of claim 1 wherein the updated set of attributes reference the set of updated destinations.

6. The computer implemented method of claim 1 wherein the updated destinations is a linked list and the updated attributes reference the linked list's head.

7. The computer implemented method of claim 1 wherein the updated destinations is a linked list and the updated attributes reference the linked list's head and tail.

8. A computer implemented method comprising:
   selecting a first data structure, the first data structure corresponding to a best path to a destination;
   referencing a first element of a second data structure from the selected first data structure, the first element indicating a set of attributes of the best path, wherein the set of attributes does not include a network prefix;
   referencing a second element of a third data structure from the first element, the second element indicating the destination;
   determining a second destination to be unreachable; and
   referencing a third element of the third data structure from a dummy element of the second data structure, the third element indicating the second destination.

9. The computer implemented method of claim 8 further comprising:
   selecting the first element in the second data structure;
   tracing a chain of elements of the third data structure from the selected first element;
   creating an update message, the update message indicating the set of attributes;
   indicating a set of destinations that are indicated by the chain of elements in the update message; and
   transmitting the network update message.

10. The computer implemented method of claim 8 wherein the second data structure is a hash table.

11. The computer implemented method of claim 8 wherein the third data structure is a radix trie.

12. A network device comprising:
    a memory to host a routing table, the routing table to include a first data structure to indicate a set of destinations and a second data structure to indicate a set of attributes; and
    a set of one or more processors coupled with the memory, the set of processors to process a network update message that indicates one of the set of destinations and a subset of the set of attributes and to insert the one of the set of destinations into a chain of elements of the first data structure in accordance with the network update message, the chain to be referenced by an element of the second data structure that indicates the subset of the set of attributes, wherein the set of attributes does not include a network prefix,
    wherein the set of processors is to insert a second element of the first data structure into a second attribute-oriented chain that is referenced by a dummy element of the second data structure.

13. The network device of claim 12 wherein the first data structure is a radix trie.

14. The network device of claim 12 wherein the second data structure is a hash table.

15. A network device comprising:
    a memory to host a routing table, the routing table to include a first data structure to indicate a set of destinations and a second data structure to indicate a set of attributes; and
    a set of one or more processors coupled with the memory, the set of processors to process a network update message that indicates one of the set of destinations and a subset of the set of attributes and to insert the one of the set of destinations into a chain of elements of the first data structure in accordance with the network update message, the chain to be referenced by an element of the second data structure that indicates the subset of the set of attributes, wherein the set of attributes does not include a network prefix,
    wherein the set of processors is to trace the attribute-oriented chain of elements, to generate a second network update message, and to indicate a subset of the set of destinations in the second network update message, the subset of destinations indicated by the attribute-oriented chain of elements.

16. A network device comprising:
    a line card to receive an update message that indicates a destination and a set of attributes; and
    a control card coupled with the line card, the control card to host a routing table, the routing table to include a first data structure to indicate a set of destinations and a second data structure to indicate a plurality of attributes, the control card to process the update message and to insert the destinations into a chain of elements of the first data structure in accordance with the update message, the chain to be referenced by an element of the second data structure, the element of the second data structure to indicate the set of attributes, wherein the set of attributes does not include a network prefix,
    wherein the line card is to receive an unreachability update message indicating a second destination, and wherein the control card is to process the unreachability update message, to select a second element of the first data structure that indicates the second destination and to insert the selected second element into a dummy attribute-oriented chain.

17. The network device of claim 16 wherein the first data structure is a radix trie.

18. The network device of claim 16 wherein the second data structure is a hash table.

19. A network device comprising:
a line card to receive an update message that indicates a destination and a set of attributes; and
a control card coupled with the line card, the control card to host a routing table, the routing table to include a first data structure to indicate a set of destinations and a second data structure to indicate a plurality of attributes, the control card to process the update message and to insert the destinations into a chain of elements of the first data structure in accordance with the update message, the chain to be referenced by an element of the second data structure, the element of the second data structure to indicate the set of attributes, wherein the set of attributes does not include a network prefix,
wherein the control card is to trace the chain of elements, to generate a second network update message, and to indicate a subset of the set of destinations in the second network update message, the subset of destinations indicated by the chain of elements.

20. A machine readable storage medium, which when executed by a set of one or more processors, cause said set of processors to perform operations comprising:
selecting an updated set of attributes in a routing table before selecting a set of updated destinations associated with the selected set of attributes, wherein the set of attributes does not include a network prefix;
generating an update message that includes the set of updated destinations for the set of attributes;
selecting a dummy attribute in the routing table before selecting a second set of updated destinations associated with the dummy attribute; and
generating a second update message indicating the second set of updated destinations as unreachable.

21. The machine readable medium of claim 20 wherein the routing table includes a destination data structure that includes the set of updated destinations, a set of path data structures, and an attribute data structure that includes an entry indicating the updated set of attributes.

22. The machine readable medium of claim 21 wherein the destination data structure is a radix trie.

23. The machine readable medium of claim 21 wherein the destination data structure is a hash table.

24. The machine readable medium of claim 20 wherein the updated set of attributes reference the set of updated destinations.

25. The machine readable medium of claim 20 wherein the set of updated destinations is a linked list and the updated set of attributes reference the linked list's head.

26. The machine readable medium of claim 20 wherein the set of set of updated destinations is a linked list and the updated set of attributes reference the linked list's head and tail.

27. A machine readable storage medium, which when executed by a set of one or more processors, cause said set of processors to perform operations comprising:
selecting a first data structure, the first data structure corresponding to a best path to a destination;
referencing a first element of a second data structure from the selected first data structure, the first element indicating a set of attributes of the best path, wherein the set of attributes does not include a network prefix;
referencing a second element of a third data structure from the first element, the second element indicating the destination;
determining a second destination to be unreachable; and
referencing a third element of the third data structure from a dummy element of the second data structure, the third element indicating the second destination.

28. The machine readable medium of claim 27 further comprising:
selecting the first element in the second data structure;
tracing a chain of elements of the third data structure from the selected first element;
creating an update message, the update message indicating the set of attributes;
indicating a set of destinations that are indicated by the chain of elements in the update message; and
transmitting the network update message.

29. The machine readable medium of claim 27 wherein the second data structure is a hash table.

30. The machine readable medium of claim 27 wherein the third data structure is a radix trie.

31. A machine readable storage medium, which when executed by a set of one or more processors, cause said set of processors to perform operations comprising:
selecting an element of a first data structure that is marked, the element indicating a set of attributes, wherein the set of attributes does not include a network prefix;
creating a network update message;
indicating the set of attributes in the message;
indicating a set of one or more destinations in the update message, the set of destinations indicated by a set of linked elements of a second data structure, the element of the first data structure referencing the set of linked elements;
determining a second destination to be unreachable; and
referencing a fourth element of the second data structure from a dummy element of the first data structure, the fourth element indicating the second destination.

32. The machine readable medium of claim 31 further comprising:
selecting a third data structure, the third data structure corresponding to a best path to a destination;
referencing a second element of the first data structure from the selected third data structure, the second element indicating a second set of attributes, the second set of attributes describing the best path; and
referencing a third element of the second data structure from the second element, the third element indicating the destination.

33. The machine readable medium of claim 31 wherein the first data structure is a hash table.

34. The machine readable medium of claim 31 wherein the third data structure is a radix trie.

* * * * *